United States Patent
Ruster et al.

(10) Patent No.: US 9,648,561 B2
(45) Date of Patent: May 9, 2017

(54) ACCESS POINT DEVICE WITH WAKEUP MODE

(75) Inventors: Jean-Pierre Ruster, Sunnyvale, CA (US); Chandra Shaker Buddhavaram, Fremont, CA (US)

(73) Assignee: Seagate Technology LLC, Cupertino, CA (US)

(*) Notice: Subject to any disclaimer, the term of this patent is extended or adjusted under 35 U.S.C. 154(b) by 1133 days.

(21) Appl. No.: 13/191,719

(22) Filed: Jul. 27, 2011

(65) Prior Publication Data

US 2013/0028157 A1    Jan. 31, 2013

(51) Int. Cl.
G08C 17/00    (2006.01)
H04W 52/02    (2009.01)

(52) U.S. Cl.
CPC ......... *H04W 52/0206* (2013.01); *Y02B 60/50* (2013.01)

(58) Field of Classification Search
USPC ........ 340/5.72; 370/311, 329, 328; 455/522, 455/574, 458, 502; 713/320, 323
See application file for complete search history.

(56) References Cited

U.S. PATENT DOCUMENTS

| | | | |
|---|---|---|---|
| 2005/0215274 A1* | 9/2005 | Matson et al. | 455/522 |
| 2005/0245292 A1* | 11/2005 | Bennett et al. | 455/574 |
| 2007/0066329 A1* | 3/2007 | Laroia et al. | 455/502 |
| 2009/0221303 A1* | 9/2009 | Soliman | 455/458 |
| 2010/0002610 A1* | 1/2010 | Bowser et al. | 370/311 |
| 2010/0110979 A1* | 5/2010 | Chen et al. | 370/328 |
| 2010/0150045 A1* | 6/2010 | Hundal et al. | 370/311 |
| 2010/0172276 A1* | 7/2010 | Aragon | 370/311 |
| 2010/0191992 A1* | 7/2010 | Shen et al. | 713/320 |
| 2010/0246461 A1* | 9/2010 | Hsieh et al. | 370/311 |
| 2011/0032075 A1* | 2/2011 | Alrabady et al. | 340/5.72 |
| 2011/0105200 A1* | 5/2011 | Tomita et al. | 455/574 |
| 2011/0119510 A1* | 5/2011 | Ahn | 713/323 |
| 2011/0296215 A1* | 12/2011 | Mobin et al. | 713/323 |
| 2012/0026925 A1* | 2/2012 | Vempati | 370/311 |
| 2012/0163305 A1* | 6/2012 | Nimbalker et al. | 370/329 |
| 2012/0270497 A1* | 10/2012 | Merrill et al. | 455/41.1 |

OTHER PUBLICATIONS http://en.wikipedia.org/wiki/MiFi; pp. 1-8.
http://www.novatelwireless.com/index.php?option=com_content&view=article&id=142&Itemid=49; pp. 1-4 & 63.
http://revolutionwifi.blogspot.com/2010/11/wake-on-wireless-lan.html; pp. 1-10.

* cited by examiner

*Primary Examiner* — Chirag Shah
*Assistant Examiner* — Jael Ulysse
(74) *Attorney, Agent, or Firm* — Hall Estill Attorneys at Law

(57) ABSTRACT

Method and apparatus for communicating over a wireless network. In accordance with some embodiments, an access point (AP) device is provided that is capable of transitioning from a low power standby mode to an operational mode responsive to receipt of a wireless communication signal from a client device coupled to the AP device.

20 Claims, 3 Drawing Sheets

ACCESS POINT DEVICE WITH WAKEUP MODE

SUMMARY

Various embodiments of the present invention are generally directed to a method and apparatus for communicating over a wireless network.

In accordance with some embodiments, an apparatus generally comprises an access point (AP) device that is capable of transitioning from a low power standby mode to an operational mode responsive to receipt of a wireless communication signal from a client device.

In accordance with other embodiments, an apparatus generally comprises a client device and a content streaming (CS) device coupled via a wireless interface to the client device in a wireless network, the CS device comprising a wireless module, a controller, a data storage device and a battery. The CS device is capable of operating the wireless module in a powered mode to detect a wireless communication signal from the client device and, in response thereto, transition the controller and the data storage device from a low power standby mode to an operationally powered mode to service the detected wireless communication signal.

In accordance with other embodiments, a method generally comprises coupling a client device to an access point (AP) device in a wireless network; placing the AP device into a low power standby mode responsive to a detected period of inactivity between the client and the AP devices; using the client device to transmit a wireless communication signal to the AP device; and transitioning the AP device from the low power standby mode to an operational power mode responsive to detection of the wireless communication signal.

These and other features and advantages which characterize the various embodiments of the present invention can be understood in view of the following detailed discussion and the accompanying drawings.

DETAILED DESCRIPTION

Figure 1:
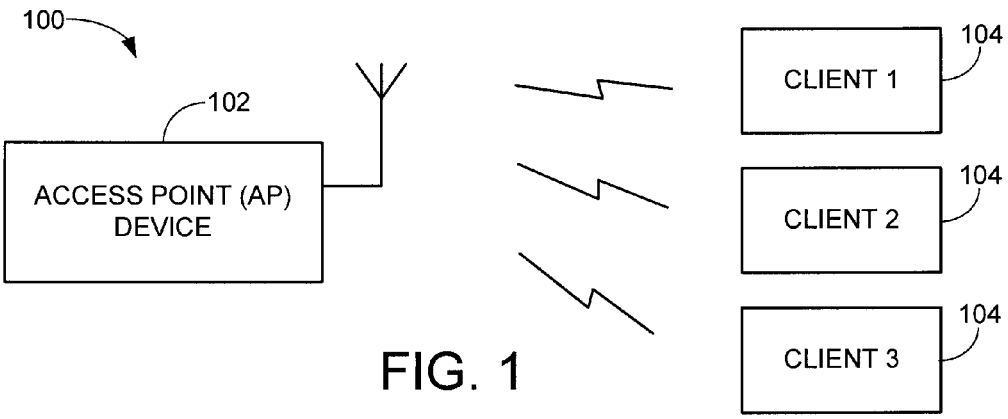
FIG. 1 is a functional block representation of an exemplary wireless network in accordance with some embodiments.

The present disclosure generally relates to wireless networks, and more particularly, to improvements in the manner in which data exchanges take place between devices in such networks.

Wireless networks are multi-device communication systems in which various devices exchange data along non-cable based communication paths, such as through the use of radio waves. There are a variety of open and proprietary standards that establish protocols for such networks.

Each device in a wireless network is sometimes referred to as a station. Stations can be differentiated by the different functions that they perform. Clients (or "client devices") can be characterized as stations that are utilized by end users. Exemplary clients may include laptop computers, tablets, smart phones and other hand held mobile devices. A client device may incorporate a graphical user interface (GUI) to enable the user to access data stored elsewhere in the wireless network, or in another network coupled to the wireless network.

Access points ("APs", or "AP devices") can be characterized as stations that are not directly utilized by end users. Exemplary APs can take a variety of forms such as routers, switches, modems, hotspot transceivers and data storage devices. It will be appreciated that a particular wireless device may operate as a client and/or an AP at different times, or even at the same time for different concurrent functions.

One difference between a wireless network and a hard-wired network is the ability of various mobile devices within a wireless network to remain connected to the network irrespective of their physical locations within the network boundaries. Thus, while each device in a wireless network is provided with an address, the address is not tied to a physical location.

The mobile nature of wireless devices means that membership of a particular station device in an existing wireless network can be transitory; a device may join or leave the network at any time. Many localized wireless networks are themselves transitory, arising when a group of station devices come into range and establish communication, and disbanding when the network is no longer needed or can no longer be maintained.

Another difference between a wireless network and a hard-wired network is the greater propensity to use battery powered devices in a wireless network, since mobile devices are often used in locations where a power grid is not always readily accessible.

Accordingly, various embodiments disclosed herein generally operate to enhance data exchanges between stations in a wireless network. As explained below, in some embodiments a wireless access point device is provided that is capable of transitioning from a low power standby mode to an operational mode responsive to receipt of a wireless communication signal from a client device. This can allow an existing wireless interconnection between an AP and a client to be maintained while facilitating extended operational battery life by the AP.

These and other features of various embodiments disclosed herein can be understood beginning with a review of FIG. 1, which provides a simplified block diagram for a wireless network 100. The network incorporates a number of station devices that communicate with one another via an appropriate standard.

The wireless network 100 includes an access point (AP) device 102 which facilitates wireless communications with and between various client devices 104. While three client devices 104 are shown in the exemplary system, the network could just utilize a single client, could utilize two clients, or could have many additional clients. The client devices 104 need not be of identical make or form; for example, the three clients in FIG. 1 may separately represent a laptop, a tablet and a smart phone, all of which are concurrently coupled to the AP device 102. Alternatively, the clients in FIG. 1 could represent three identical tablets from separate users that concurrently receive data transfers from the AP.

In some embodiments, the AP device 102 provides data storage capabilities with a large capacity internal data storage device on which various data sets are stored for access by the client devices 104. Such data sets may include songs, movies, computer files, programs, applications, and so on. In some embodiments, the device 102 can be characterized as a content streaming (CS) device capable of streaming data to the client devices 104.

While not required, the AP device 102 may have the capability of accessing other networks, such as a local area network (LAN), the Internet, etc. The client devices 104 can take any number of suitable forms. In some embodiments, the client devices 104 can be hand-held portable tablet devices. In some embodiments, the AP device 102 serves as a local hotspot for concurrent data accesses by the client devices 104. The client devices 104 may be able to separately access one or more other networks as well.

The wireless network 100 can take any suitable form. In some embodiments, the AP device 102 may be configured to only locally communicate with the client devices 104. Depending on the device configuration, in other embodiments extended capabilities may exist so that the network may be a self-contained ad hoc network or a wireless local area network (WLAN), or can be a part of a larger wireless or combination wireless/wired network. The AP device 102 can provide local data exchange capabilities for the client devices 104, and/or transmit data to the client devices 104 from another source.

Figure 2:
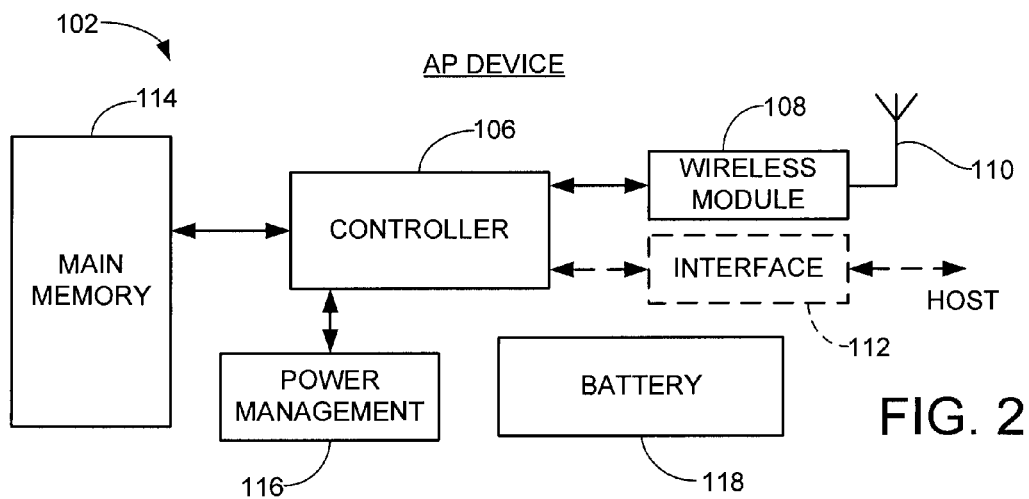
FIG. 2 is a block diagram representation of an access point (AP) device of FIG. 1.

FIG. 2 provides a functional block representation of the exemplary AP device 102 of FIG. 1. It will be appreciated that other configurations can be used. The various interconnections shown in FIG. 2 are intended to denote general interfunctionality of the various blocks, not necessarily actual internal bus structures. Similarly, a variety of additional modules may be present that have been omitted for clarity and are unnecessary for the present discussion.

The AP device 102 includes a controller 106, which provides top level control of the device. The controller can take any suitable form including one or more programmable processors and/or hardware controllers. The controller 106 may incorporate a particular chip set of integrated circuit devices configured to carry out the requisite controller functions for the AP device 102.

A wireless module 108 with an associated antenna 110 provides radio wave based communication capabilities. While it is contemplated that the antenna may be internally disposed within the AP due to the portable nature of the device, such is not limiting as the antenna may externally project from the AP or may be extendable and retractable, as desired.

An optional interface module 112 may be provided in some embodiments to allow cable-based data exchanges with a separate host (not shown). Such host-based exchanges may take place periodically using a detachable cable that is plugged into a connector of the AP housing, and that is removed from the housing at other times. A suitable interface protocol may be utilized by the module 112, such as a USB (universal serial bus) interface. Alternatively, the interface module 112 may be omitted entirely and all communications provided via the wireless module 108.

A main memory 114 of the AP device 102 provides a relatively large non-volatile data memory space. In some embodiments, the memory 114 may be characterized as one or more internal hard disc drives (HDDs). Other forms of memory can be used, such as but not limited to a Flash memory array. While not separately shown in FIG. 2, it will be understood that the AP device 102 may further include local volatile or non-volatile random access memory (RAM) for use by the controller 106 to store programming and control information, as well as for data buffering during data transfer operations between the main memory 114 and the clients 104 (FIG. 1).

A power management block 116 provides power management functions for the AP device 102 as discussed in greater detail below. At this point it will be noted that the power management block 116 operates to direct and manage the charging of a rechargeable battery 118 which supplies electrical power for use by the AP device 102. Such charging can take place in a variety of ways, including through the interface module 112 when the AP device 102 is connected to a host, through a separate power cord (not shown), etc.

Figure 3:
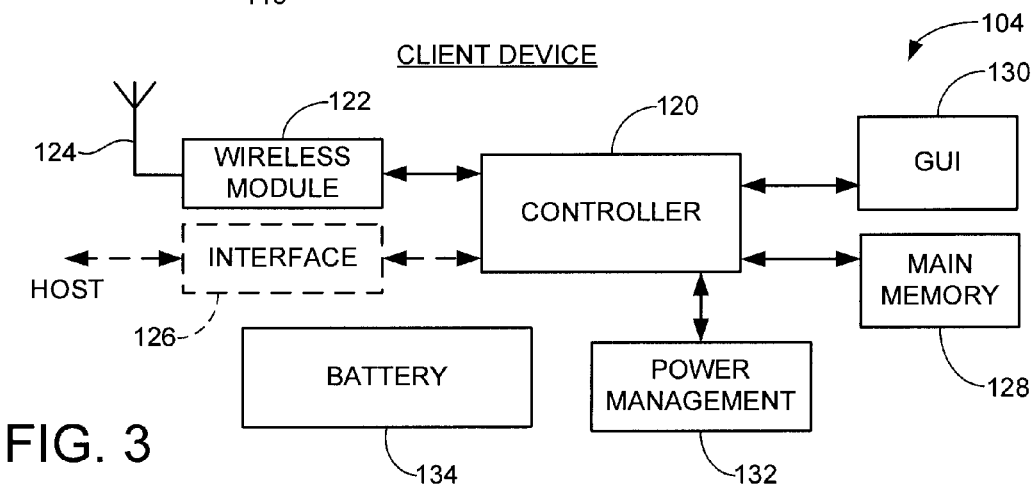
FIG. 3 is a block diagram representation of a client device of FIG. 1.

FIG. 3 provides a corresponding functional block representation of a selected one of the client devices 104 in FIG. 1. As before, this is merely exemplary as any number of suitable configurations can be used. It will be noted that the exemplary AP device 102 and the exemplary client device 104 may include a number of similar components.

A client controller 120 provides top level control for the client 104. A wireless module 122 has an associated antenna 124 to facilitate wireless communications. It is contemplated that in the network 100 of FIG. 1, the respective antennas and wireless modules of the AP 102 and client 104 communicate with each other at appropriate times. It will be appreciated, however, that concurrent communications may also take place with other networks. For example, the wireless module 122 of FIG. 3 may establish a separate interconnection with a different network, such as a nationwide 4G network to which the user of the client commercially subscribes.

As with the AP device 102 in FIG. 2, the client device 104 in FIG. 3 may further include an optional interface 126 to facilitate cable-based communications with a host device such as through the use of a detachable USB cable. As before, such separate interface is not necessarily required.

The client device 104 is provisioned with a main memory 128 and a graphical user interface (GUI) 130. In some embodiments the main memory 128 may be a local Flash array with an overall data capacity that is less than the data capacity of the AP main memory 114 of FIG. 2. In this way, the main memory 114 of the AP device 102 can serve as additional, secondary storage for the client device 104. For example, the AP device 102 can be used to store a library of movies, and the client device 104 can request a transfer of a particular title to its local main memory 128 for display on the client GUI 130. The GUI can take a variety of forms and may include a touch screen, a keyboard, one or more user selectable buttons, a computer/LCD display, speakers, a headphone jack, and so on.

A power management circuit 132 is provided in the client device 104 to manage power states of the client device, and to oversee the charging and use of electrical power in a rechargeable battery 134. As before, the client battery can be recharged in any suitable way, such as during interconnection with a host through the interface module 126.

Figure 4:
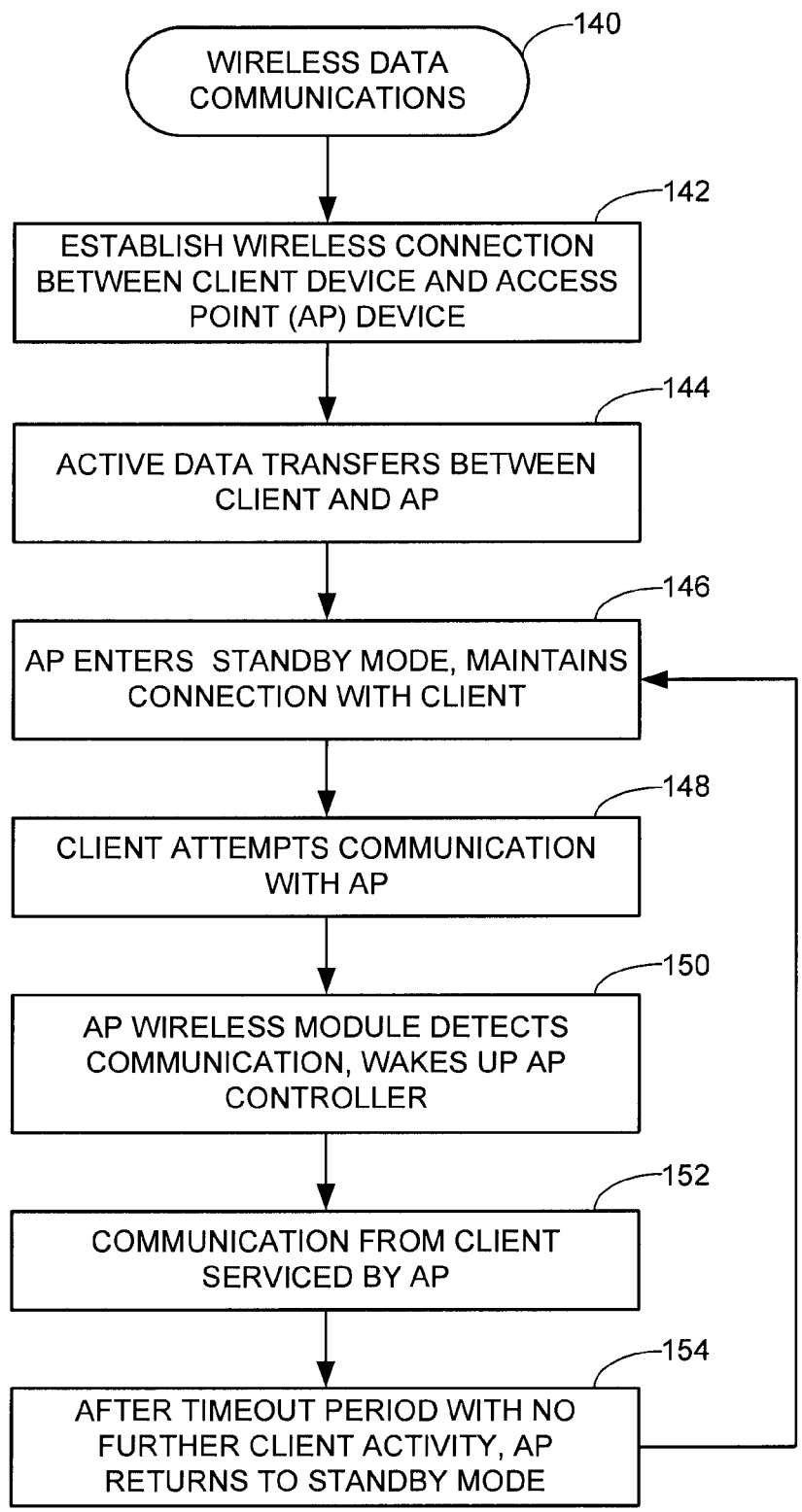
FIG. 4 is a flow diagram for a WIRELESS DATA COMMUNICATION routine illustrating steps carried out in accordance with some embodiments.

FIG. 4 shows a flow chart for a WIRELESS DATA COMMUNICATIONS routine 140, generally illustrative of steps carried out in accordance with various embodiments. While not limiting, the routine 140 is contemplated as describing steps that may be carried out during communications between the exemplary client device 104 in FIG. 3 and the exemplary AP device 102 in FIG. 2. In some embodiments, the data source device in the routine of FIG. 4 may be characterized as a content streaming (CS) device.

At step 142, a wireless interconnection is established between the client 104 and the AP 102. The devices may communicate by sending packets having a format predefined by the associated wireless standard. In some embodiments, an exemplary packet communication may be arranged in the form of multi-byte frames that include address, payload and error correction data. The address header may be a media access control (MAC) address which provides a unique identifier for each device. Depending on the format, the address of both the transmitting device and the receiving device may be provided in the frame in separate address headers.

Special types of frames, such as beacon frames and association request frames, may be sent by the AP 102 or the client 104 to initially establish the interconnection. It is noted that acknowledgement frames may also be transmitted at the conclusion of each frame transmission using a handshaking arrangement. Once a connection is established, the AP dedicates certain resources for use by the client. In some embodiments, the AP may only be able to maintain active connections with up to a maximum number of clients at a time. In such cases, the AP may provide a corresponding number of "slots" that are allocated for such connections.

Once the interconnection is established, the AP 102 and the client 104 exchange data as desired, as indicated by step 144. There is no requirement that any data be transferred, although it will be appreciated that wireless connections as shown by step 142 are often made for the express purpose of carrying out active data exchange operations. The data transfer period indicated by step 144 may include actual data transfers (e.g., requests for certain data that is transferred from the AP to the client over a series of frames) as well as periodic status type exchanges that indicate, or otherwise maintain, the two devices in an active communication relationship.

As shown by step 146, it is contemplated that at some point an inactivity period of elapsed time will be detected by the AP 102. The inactivity period can be defined in any number of ways. In some embodiments, the inactivity period corresponds to an elapsed period of time during which no client requests for data transfers have been received (e.g., a request for a transfer of a specific file or other data set from the AP to the client). The AP device enters a low power standby mode responsive to the detection of the inactivity period.

The detection of the inactivity period by the AP 102 can be determined using functionality of the controller and/or the power management circuitry of the AP (see e.g., 106, 116 of FIG. 2). An internal timer can be reset each time a communication is received from the client, and the inactivity period can be triggered if a predetermined maximum count value is reached. While not necessarily required, it is contemplated that the connection is still in place between the AP and the client when the AP enters the reduced power standby mode; that is, no disassociation frames or other indications will have been transmitted to the AP device by the client that indicate the client has decided to terminate further communications with the AP.

In entering the standby mode, the power management circuitry (e.g., 116, FIG. 2) operates to power down significant portions of the AP device 102. In some embodiments, this may include all portions of the device except for the wireless module 108, which is maintained in an operationally ready ("awake") condition. The larger power consuming portions of the device, such as the main memory 114 and the controller 106, are powered down, either to a reduced functionality state or to a completely off state.

In some embodiments, a progression of lower power states are entered the longer the AP device 102 continues to not receive client communications. For example, a first lower power state may be initially obtained by spinning down the discs and turning off some circuitry of the controller; a second lower power state may further turn off additional circuitry, and so on. In this scheme, generally the longer the period of continued inactivity, the deeper "asleep" the device becomes, and the longer it will generally take to rouse the device back to its normal operationally powered state.

The client device 104 next attempts to communicate with the AP device 102 at step 148. This communication may take a variety of forms. In some embodiments, the communication frame is characterized as a ping type signal having a format capable of verifying the connection between the AP and the client still exists. In other embodiments, the communication may take the form of an actual request for data, such as a request to access a directory or other data structure resident on (or accessible by) the AP.

Regardless of format, the communication signal sent by the client 104 to the AP device 102 is detected by the wireless module 108 of the AP, which in response wakes up other portions of the AP device in order to service the received signal. This operation is depicted by step 150. In some embodiments, the wakeup signal from the wireless module 108 may take the form of an interrupt that is forwarded to the controller 106. In response, the controller transitions to an operationally powered mode in order to service the command. Depending on the style of the communication, other portions of the AP may be awakened at this time. For example, the controller 106 may forward a wakeup signal to the main memory 114 of the AP, causing the main memory to spin up the discs or otherwise take the necessary steps to transition to an operationally ready mode.

The communication from the client 104 is serviced by the now awakened AP 102 at step 152. This may include one or more communication frames forwarded by the AP back to the requesting client. In some embodiments, the AP will maintain itself in an operationally ready mode until such time that a sufficient inactivity period timeout is reached, after which the AP will once again transition back to the standby mode, as shown at step 154. While other lower power modes are envisioned, it is contemplated that in at least some embodiments the AP device achieves the same power state as previously set in step 146, and the wireless module 108 of the AP device 108 remains awake to monitor for further communications from the client.

The periodic communications from the client 104 to the AP 102 at step 148 can be user directed or automatically generated by the client. In the case of a user directed communication, the user may have accessed the GUI functionality of the client and requested a data transfer with the AP. In the case of an automatically generated communication, the client may use special programming, such as a specially configured application that is downloaded and accessed by the client to periodically forward communications to the host.

The timing and style of the communications can be configured to be compatible with the various timeout characteristics and/or settings of the AP to increase the availability and responsiveness of the AP to the client with minimal delay and, at the same time, reducing power consumption levels of the AP so as to extend the available service period during which the client can communication and effect data exchanges with the AP. In some embodiments, a ping type communication is used to initially establish the interconnection between the client and the AP, and then other, non-ping type communications, such as requests for data, will be sent and the AP will wake up responsive to such communications.

Figure 5:
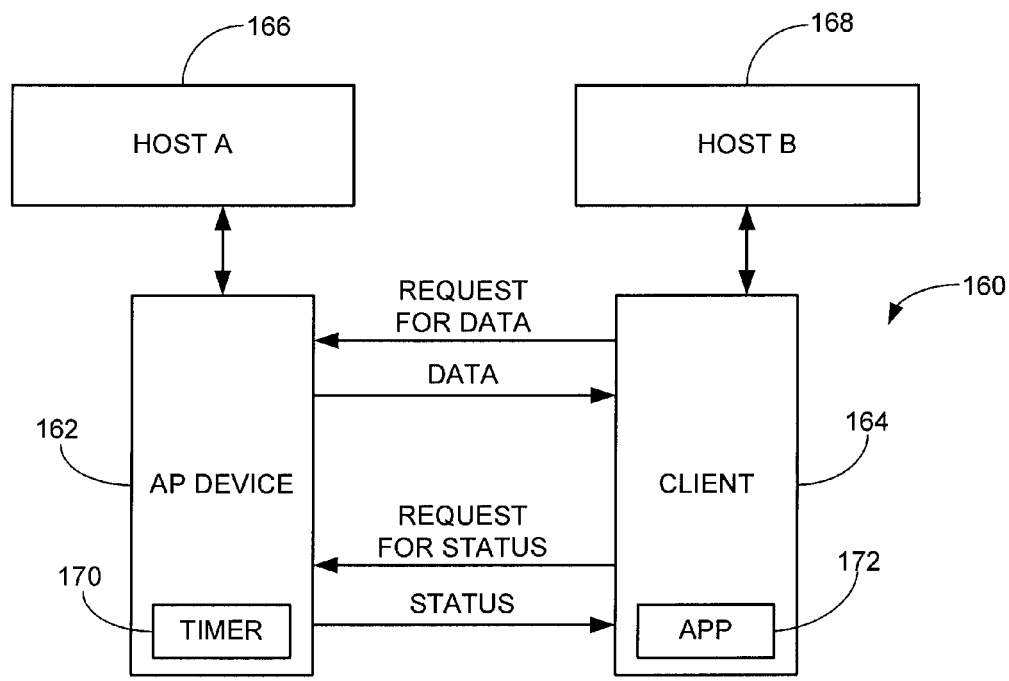
FIG. 5 illustrates a data exchange sequence between an AP device and a client device in accordance with some embodiments.

FIG. 5 shows a simplified functional block diagram of another wireless network 160 generally similar to the network 100 discussed above. The network 160 includes an access point (AP) device 162 and a client device 164 similar to those set forth in FIGS. 1-3. In some embodiments, the AP device 162 may be characterized as a content streaming (CS) device adapted to stream media content to the client device. Requests for active data transfers may be made by the client 164 to the AP 162 via a wireless interface, and in response, the AP forwards the requested data back the client via the wireless interface. Similarly, from time to time the client 164 may send a status request (e.g., a ping signal, etc.) to the AP 162, and in response, the AP forward back a reply.

Both the AP 162 and the client 164 are further shown to be interconnected with host devices 164, 166 via cable-based interfaces. These host-device interconnections can be of a temporary nature, or can be of a more permanent nature, as required. The host-device interconnections can facilitate a variety of operations, such as the recharging of the respective batteries of the client and the AP, as well as facilitating data transfers (e.g., uploading of applications, audio-visual works, etc.) between the hosts and the devices.

In some embodiments, the existence of the interconnection between HOST A 166 and the AP 162 causes the AP to remain in a fully operational mode. That is, the AP will proceed as set forth in FIG. 4 to enter a lower power mode only if no readily available source of power is detected. In other embodiments, however, the AP device can be configured to operate in accordance with the flow of FIG. 4 irrespective of whether a host interconnection is detected.

A timer module is depicted by block 170. This can be used to detect the presence of an inactivity period sufficient to cause a power state transition of the AP 162 based on the communications received from the client. In some embodiments, some types of communications (e.g., data requests) from the client cause the timer to reset, while other types of communications (e.g., status requests) from the client do not interrupt and reset the timer. The types of communications and their effect on the timer can be user selectable at the AP and/or client level.

An application (APP) module is depicted by block 172. This can be a resident program downloaded by the user to the local memory (e.g., main memory 128, FIG. 3) from a suitable source, including but not limited to the AP device 162, the hosts 166, 168, or some other location accessible by the client device 164. The application 172 can operate to output periodic communications to the AP 162 as discussed above, and can further operate to set the parameters relating to the lower power mode operation of the AP.

Figure 6:
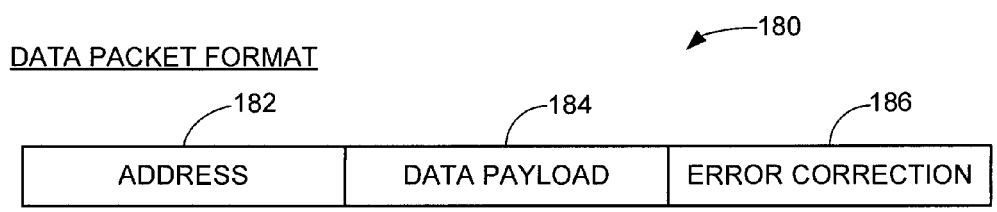
FIG. 6 depicts an exemplary communication frame packet format useful in accordance with various embodiments.

FIG. 6 is a basic format for an exemplary data packet 180 in accordance with some embodiments. It will be appreciated that this is merely exemplary and is not limiting; the particular packet format can vary depending on the requirements of a given application, including the associated wireless standard used to govern the client-AP communications. In some embodiments, the data packet 180 can include one or more address fields 182, a data payload field 184 and an error correction field 186. The actual size (in bytes) of each field may vary, so FIG. 6 is merely generalized and is not to be taken as being to scale. Moreover, additional fields, and other fields, can readily be incorporated into the packets.

The address fields 182 can store address information relating to the target device (e.g., the client or the AP) as well as address information relating to the sending device (e.g., the client or the AP). The addresses can take a variety of forms, including unique ID values assigned to each device and session-based ID values assigned for a particular network session.

The data payload field 184 can include data that are transferred to the target device. This may include user data (e.g., a portion of a file transferred between the AP and the client), a command, or some other information. The error correction field 186 may be characterized as error detection and correction bits used to ensure accurate transmission of the data, allowing a small number of bit errors to be detected and corrected in the forwarded packet. It is contemplated that communications between the AP and the client in accordance with the present discussion may take place using packets formatted as shown in FIG. 6. In some embodiments, an initial packet may be forwarded by one of the devices, and a confirmation (e.g., an acknowledgement) may be forwarded back by the other one of the devices.

Figure 7:
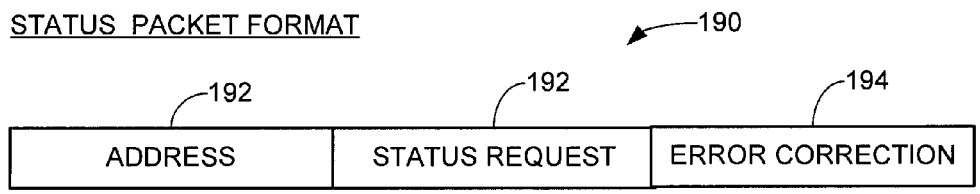
FIG. 7 shows another exemplary communication frame packet format useful in accordance with various embodiments.

FIG. 7 shows a generalized format for a status packet 190 that can be transmitted in accordance with various embodiments. This is similar to the format of FIG. 6, and includes address fields 192, a status request field 194 and error correction field 196. This may be used during a ping command to simply send out a request to determine of a particular device is still connected to the network. Date and time stamp information can be included in the packet. As before, both the client and the AP may send packets as formatted in FIG. 7 at various times as required.

In some embodiments, the system may operate as described above so long as packets as generally formatted in FIG. 6 continue to be sent and received on regular intervals. Packets as formatted in either FIG. 6 or FIG. 7 may be sufficient to wake up the AP from a lower power mode. Moreover, packets as formatted in FIG. 7 (e.g., beacon type packets) can be sent by the AP while the AP is in a reduced power mode.

While not required, as discussed above in some embodiments the AP may have one or more local memories to provide extended data storage capabilities for the client devices. The memories may take a variety of forms such as a hard disc drive (HDD), a solid-state drive (SSD), a hybrid HDD, a flash array, a DRAM module, etc. The power states of such memories can be altered to a reduced power state when the device is in the low power mode. Different levels of reduced power state are envisioned, such as a state in which one or more motors (actuator motors, disc motors, etc.) are powered down.

It is contemplated that, as discussed above, in some embodiments the receipt of a communication signal by the wireless module of the AP will result in the forwarding of an interrupt signal to the AP controller, which will interrupt the current low power mode of operation, cause the controller to resume operation at an operational power mode and service the command. Depending on the nature of the command, additional aspects of the AP device (e.g., a memory) may be transitioned by the controller to an operationally powered mode to facilitate the servicing of the command. For example, the command may be to transfer a selected file in the AP memory to the client, so that the controller and then the memory are successively activated in order to transfer the file.

The operational range (intervening distance) between the client and the AP can be set as desired. In some embodiments, the AP device will be intended to have a relatively short range, such as on the order of from less than about 10 feet to about 30 feet or more. Thus, in at least some embodiments the AP device can be in a backpack, satchel or other device in relative proximity to the user and accessed without any need for the user to touch or otherwise physically activate the AP device. The AP device can be configured to operate within the confines of a vehicle, such as in the case of one or more users who wish to independently and concurrently access different data sets (e.g., children in the backseat of a vehicle each watching a different movie on a separate tablet device). The AP can be located within a particular room or area in which the client(s) are located, and so on.

It will now be appreciated that the various embodiments disclosed herein can provide benefits over the prior art. Wireless communication systems configured as disclosed herein may provide lower power consumption rates as compared to other systems, which may serve to lengthen available battery life after a particular battery recharging cycle. Moreover, no special steps need be taken to awaken the AP once it is placed into a lower power mode; rather, in at least some embodiments, the mere request for data can be sufficient to awaken the AP and allow the AP to service the request.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising an access point (AP) device comprising: a controller circuit and an antenna configured to:
   establish an active wireless connection with a client device, transition from an operational mode to a low power standby mode while maintaining the active wireless connection with the client device, and subsequently transition from the low power standby mode to the operational mode responsive to receipt of a wireless communication signal sent from the client device during the active wireless connection.

2. The apparatus of claim 1, in which the wireless communication signal from the client device is characterized as a ping signal.

3. The apparatus of claim 1, in which the AP device comprises a wireless module configured to communicate via a wireless network with the client device and a data storage device, the wireless module remaining in an active powered mode and the data storage device transitioned to the low power standby mode prior to the receipt of the wireless communication signal, the storage device transitioning to the operational mode responsive to the wireless communication signal to wirelessly transfer a data set to a memory of the client device.

4. The apparatus of claim 3, in which the data storage device comprises a hard disc drive (HDD) with at least one rotatable data storage medium accessed by a moveable read/write transducer.

5. The apparatus of claim 1, in which the AP device comprises a rechargeable battery which has a reduced power load while the AP device is in the low power standby mode.

6. The apparatus of claim 1 in which the AP device comprises a controller chip set that is transitioned from the low power standby mode to the operational mode responsive to receipt of the wireless communication signal.

7. The apparatus of claim 1, in which the wireless communication signal from the client device is generated responsive to an application previously downloaded onto the client device from a network, stored locally in memory of the client device, and executed by a controller of the client device.

8. The apparatus of claim 1, in which the AP device comprises a wireless module adapted to communicate via radio waves to the client, a controller which provides top level coordination of the AP device and a main memory, and in which in the low power standby mode the controller and the main memory are turned off and the wireless module remains turned on.

9. The apparatus of claim 1, in which the AP device includes a timer circuit which detects an inactivity period as an elapsed time during which no data requests are received from the client to transfer data from the AP device to the client, and the AP device is capable of transitioning from an operational mode to the low power standby mode responsive to the detected inactivity period.

10. The apparatus of claim 1, in which the wireless communication signal from the client device is characterized as a first type of signal, and the AP device is further configured to maintain the low power standby mode responsive to a second wireless communication signal from the client device of a second type different from the first type.

11. An apparatus comprising: a client device; and a content streaming (CS) device coupled via a wireless interface to the client device in a wireless network, the CS device comprising a wireless module, a controller, a data storage device and a battery, the CS device configured to operate the wireless module in a powered mode to detect a wireless communication signal from the client device during an active wireless network session established between the CS device and the client device and, in response to the detected wireless communication signal, transition the controller and the data storage device from a low power standby mode to an operationally powered mode to service the detected wireless communication signal.

12. The apparatus of claim 11, in which the wireless communication signal from the client device is characterized as a ping signal.

13. The apparatus of claim 11, wherein the wireless network session has an associated session identification (ID) value uniquely associated with the session, and wherein the wireless communication signal from the client device includes the session ID value.

14. The apparatus of claim 11, in which the client device comprises a controller, a main memory and a graphical user interface (GUI), and the wireless communication signal from the client device is generated responsive to an application previously downloaded to the client device main memory and executed by the client controller.

15. The apparatus of claim 11, in which the CS device further comprises a timer circuit which detects an inactivity period as an elapsed time during which no data requests are received from the client to transfer data from the CS device to the client during the active wireless network session, the CS device transitioning from an operational mode to the low power standby mode responsive to the detected inactivity period.

16. The apparatus of claim 11, in which the wireless communication signal from the client device is characterized as a first type of signal, and the CS device is further configured to maintain the low power standby mode responsive to a second wireless communication signal received from the client device of a second type different from the first type.

17. A method comprising establishing an active communication relationship between a client device and an access point (AP) device in a wireless network, the active communication relationship having an assigned session-based identification (ID) value, the AP device comprising a controller circuit and an antenna placing the AP device into a low power standby mode responsive to a detected period of inactivity between the client and the AP devices during continued maintenance of the active communication relationship;
using the client device to transmit a wireless communication signal to the AP device during continued maintenance of the active communication relationship; and
transitioning the AP device from the low power standby mode to an operational power mode responsive to detection of the wireless communication signal during continued maintenance of the active communication relationship.

18. The method of claim 17, in which the wireless communication signal from the client device is characterized as a ping signal, and the transitioning step comprises placing a controller of the AP device into the operational power mode to issue a response to the ping signal.

19. The method of claim 17, in which the wireless communication signal from the client device is characterized as a data request signal, and the transitioning step comprises placing a controller and a data storage device of the AP device into the operational power mode to transfer a data set requested by the data request signal from the data storage device of the AP device to a memory of the client device.

20. The method of claim 17, wherein the transmitted wireless communication signal comprises the session-based identification (ID) value assigned to the established communication relationship.

* * * * *